United States Patent
Izumizaki et al.

(10) Patent No.: US 6,505,010 B1
(45) Date of Patent: Jan. 7, 2003

(54) IMAGE FORMING APPARATUS

(75) Inventors: Masami Izumizaki; Yoshinori Nagao, both of Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 07/933,651

(22) Filed: Aug. 24, 1992

(30) Foreign Application Priority Data

Aug. 26, 1991 (JP) .............................................. 3-240658
Oct. 29, 1991 (JP) ............................................. 3-308301

(51) Int. Cl.⁷ ............................................. G03G 15/01
(52) U.S. Cl. ............................. 399/39; 399/49; 399/60
(58) Field of Search .............................. 399/39, 49, 60, 399/40, 41, 72; 347/131, 129; 358/517, 518, 519, 520

(56) References Cited

U.S. PATENT DOCUMENTS

| | | | | |
|---|---|---|---|---|
| 4,888,636 A | * | 12/1989 | Abe ........................ | 346/157 X |
| 4,916,547 A | * | 4/1990 | Katsumata et al. ...... | 346/157 X |
| 4,937,664 A | * | 6/1990 | Chiku et al. ............. | 355/327 X |
| 5,006,896 A | * | 4/1991 | Koichi et al. ............ | 355/246 |
| 5,038,175 A | * | 8/1991 | Sohmiya et al. .......... | 355/246 |
| 5,041,877 A | * | 8/1991 | Matsumoto ............. | 355/271 |
| 5,057,870 A | * | 10/1991 | Aoki ....................... | 355/246 |
| 5,083,160 A | * | 1/1992 | Suzuki et al. ............ | 355/208 |
| 5,099,260 A | * | 3/1992 | Sato et al. ............... | 346/154 |
| 5,103,260 A | * | 4/1992 | Tompkins et al. ....... | 355/208 |
| 5,148,289 A | * | 9/1992 | Nishiyama et al. ...... | 346/157 X |
| 5,175,585 A | * | 12/1992 | Matsubayashi et al. .. | 355/208 |

FOREIGN PATENT DOCUMENTS

| | | | |
|---|---|---|---|
| JP | 0171276 | * | 9/1984 |
| JP | 0035073 | * | 2/1988 |
| JP | 63-147177 | | 6/1988 |
| JP | 63-280275 | | 11/1988 |
| JP | 0194674 | * | 8/1989 |
| JP | 0257872 | * | 10/1989 |
| JP | 1-257872 | | 10/1989 |
| JP | 1-261668 | | 10/1989 |

* cited by examiner

*Primary Examiner*—Robert Beatty
(74) *Attorney, Agent, or Firm*—Fitzpatrick, Cella, Harper & Scinto (57) ABSTRACT

An image forming apparatus forming a full color image by plural color materials. An image of an original is color-separated so as to form a color separation signal, and the color separation signal is converted to a color signal corresponding to each color material. The color signal is color-corrected so as to correct a color mixing state of the plural color materials, and a color image is formed by the corrected color signal. A test image of single color is formed, and a density of the test image is detected. Control is performed on a correcting condition for color-correcting the color signed based on the detected density. The correction to the color signal is delayed until toner is supplemented to the developing device.

6 Claims, 7 Drawing Sheets

IMAGE FORMING APPARATUS

BACKGROUND OF THE INVENTION

1. Field of the Invention

The present invention relates to an image forming system of electrophotographic type such as a copying machine, a laser beam printer (LBP) and the like, and more particularly, it relates to an image forming system having a plurality of image bearing members and capable of forming a multi-color image.

2. Related Background Art

Image forming systems wherein a multi-color image is formed by using a plurality of electrophotographic photo-sensitive drums (image bearing members) are already known. In such image forming systems, a number of process units each including a charger, an optical scanning device, a developing device, a cleaning device and the like which are disposed around a photosensitive drum are prepared in correspondence to the number of toner colors (for example, four sets when yellow toner, magenta toner, cyan toner and black toner are used), and a transfer belt (transfer sheet feeding and image transferring means) holding and feeding a transfer sheet is disposed below the process units so that toner images formed by the respective process units are successively transferred onto the transfer sheet moving along with the transfer belt in a superimposed fashion, thereby forming a multi-color image.

In such image forming systems, an image forming system wherein test density patterns (test patches) are transferred onto the transfer belt via the process units and the toner density of each test patch is detected so as to control the toner density in each developing device (particularly, when two-component toner comprising toner and carrier is used), thereby providing the proper image is known (as disclosed in the Japanese Patent Laid-Open Appln. No. 63-147177). Further, an image forming system wherein the test patches from the process units are superimposed on the transfer belt and the change in the magnitude of one dot in the image is measured on the basis of an amount of the positional discrepancy of each test pattern and the process conditions such as exposure time, output of image light, developing bias and the like are changed on the basis of the measured data to properly correct the magnitude of one dot, thereby providing the proper image is also known (as disclosed in the Japanese Patent Laid-Open Appln. No. 63-280275). Furthermore, an image forming system wherein the proper image can be formed even when the bright potential as the maximum reference density is changed due to the environmental variation, by estimating the bright potential from the test patterns having different potentials by changing the exposure amounts applied to the photosensitive drums is also known (as disclosed in the Japanese Patent Laid-Open Appln. No. 1-261668).

However, in the above-mentioned image forming systems capable of forming the multi-color image, although the toner density in each developing device, the magnitude of one dot in the image or the bright potential of each photosensitive drum varied in accordance with the environmental condition could be controlled by utilizing the test patches, the variation of the delicate color tone in the multi-color image due to the deterioration of the photosensitive drums, deterioration of toner and/or error in the control system could not be controlled. Accordingly, particularly, in the multi-color image including picture(s), the color balance including gray balance (density balance) was unstable.

SUMMARY OF THE INVENTION

The present invention intends to eliminate the above-mentioned conventional drawback, and an object of the present invention is to provide an image forming system which can obtain the proper image by controlling even the variation in the delicate color tone, when a multi-color image is formed on a transfer sheet carried by a transfer sheet feeding and image transferring means by using a plurality of image bearing members.

In order to achieve the above object, the present invention provides an image forming system having a plurality of color image forming stations, comprising a plurality of electrophotographic photosensitive members around which latent image forming means and color developing means are arranged, transfer sheet feeding means moved along an endless path and passed through transfer positions of the photosensitive members, means for forming pattern-shaped toner images on the photosensitive members, means for transferring the pattern-shaped toner images formed on the photosensitive members on the transfer sheet feeding means or on a transfer sheet fed by the transfer sheet feeding means, pattern-shaped toner image detecting means disposed in confronting relation to the transfer sheet feeding means and adapted to detect states of the toner images transferred to the transfer sheet feeding means or the transfer sheet fed by the transfer sheet feeding means, and image forming means for controlling an image forming condition on the basis of a detection result from the pattern-shaped toner image detecting means.

DETAILED DESCRIPTION OF THE PREFERRED EMBODIMENTS

The present invention will now be explained in connection with embodiments thereof with reference to the accompanying drawings.

Figure 1:
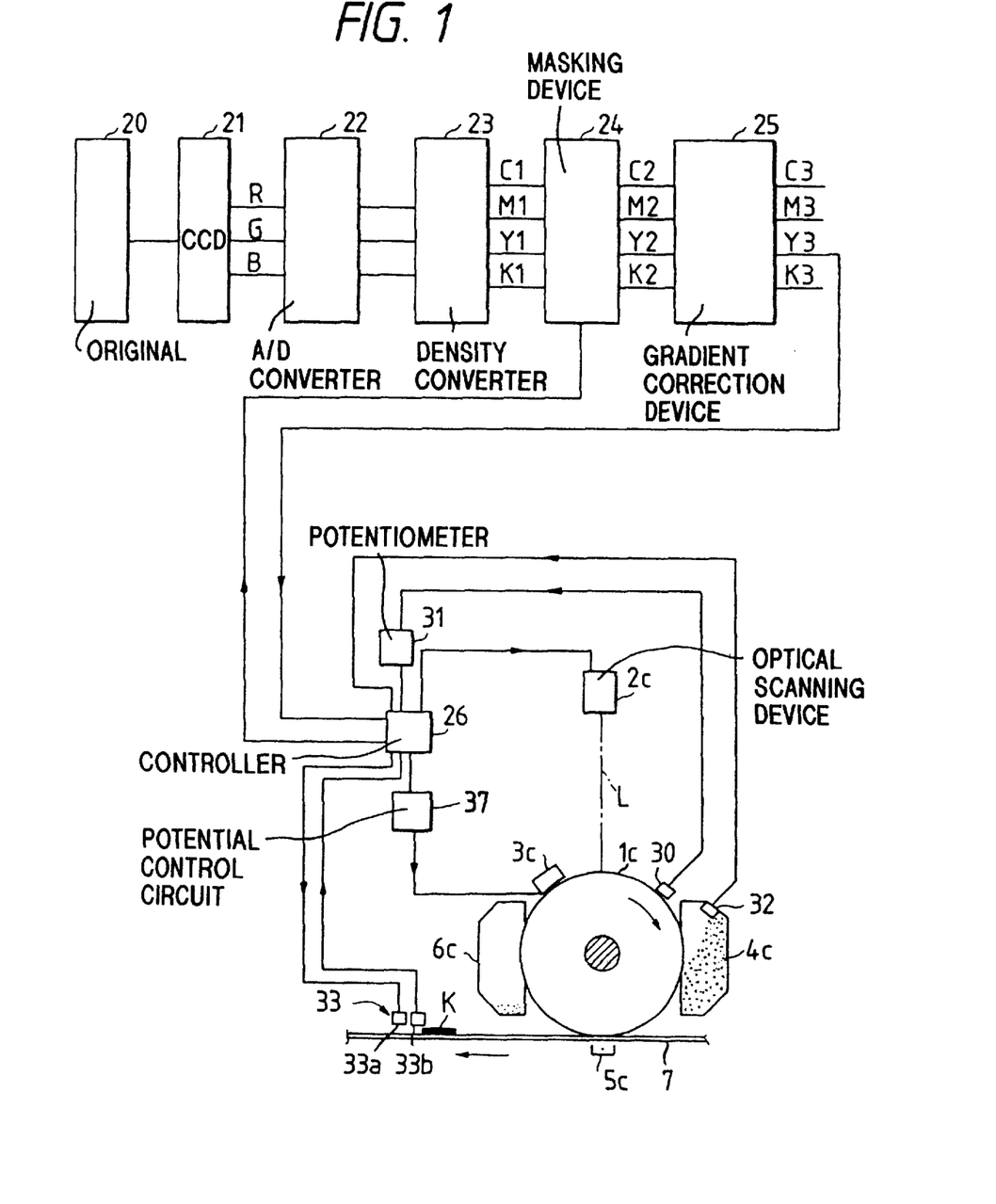
FIG. 1 is a block diagram showing an image reading and outputting portion of an image forming system according to a preferred embodiment of the present invention and for explaining the treatment and control for image light at each of stations.

First of all, a first embodiment of the present invention will be described with reference to FIGS. 1 to 3.

Figure 2:
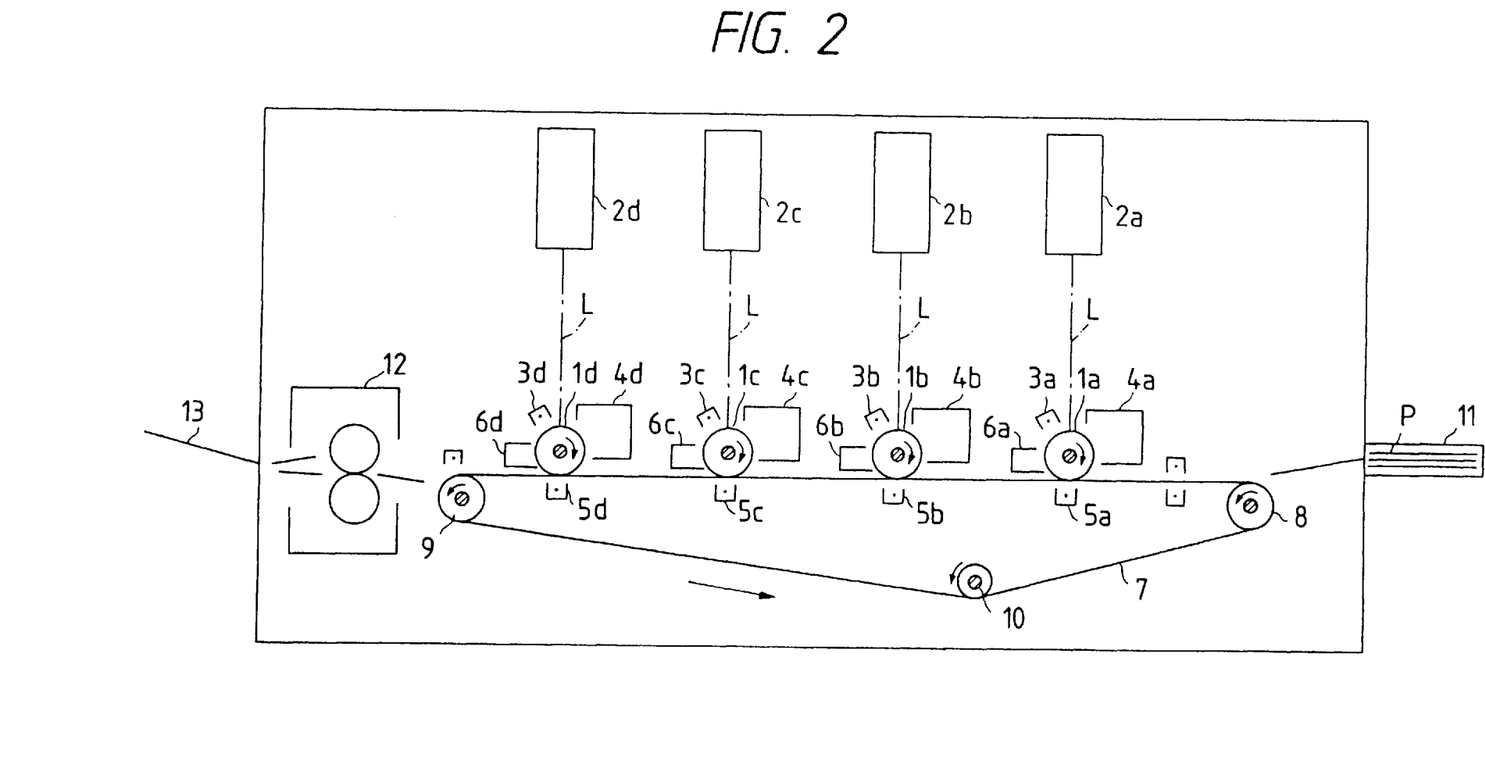
FIG. 2 is an elevational sectional view of the image forming system of FIG. 1.

FIG. 2 is an elevational sectional view of an image forming system (laser beam printer) capable of forming a four-full-color image by using magenta toner, cyan toner, yellow toner and black toner. The image forming system comprises four electrophotographic photosensitive drums (image bearing members) 1a–1d each having an OPC photosensitive layer as an electrophotographic photosensitive layer. The photosensitive drums associate with optical scanning devices 2a–2d, and around the photosensitive drums, there are arranged first or primary chargers 3a–3d for charging surfaces of the photosensitive drums uniformly, developing devices 4a–4d including magenta toner, cyan toner, yellow toner and black toner independently, transfer chargers 5a–5d for transferring toner images formed on the respective photosensitive drums onto a transfer sheet (transfer medium) P such as a plain paper sheet, and cleaning devices 6a–6d for removing residual toner from the photosensitive drums.

The optical scanning devices 2a–2d each comprises a semi-conductor laser acting as a light source, a polygonal mirror for treating image light L from the semi-conductor laser, a fθ lens for focusing the image light L on the surface of the respective photosensitive drum, a reflection mirror for deflecting the image light L and the like. Further, in each of the developing devices 4a–4d, two-component toner consisting of color toner and magnetic carrier is used, and new toner is replenished or supplied to the respective developing device in response to the consumption of toner due to the formation of the image at need. The toner has an average particle diameter of 3–20 μm and is formed by dispersing color pigment into polyester resin and adding silica as additive agent. However, according to the toner colors, toner may be constituted by styrene-acrylic resin, and carbon black, yellow pigment of benzene group, dye of antorakinon group, pigment of copper-phthalocyanine group or the like. Below the four photosensitive drums 1a–1d, there is disposed a transfer belt 7 (transfer sheet feeding and image transferring means) for holding the transfer sheet P and feeding it between the photosensitive drums 1a–1d and the transfer chargers 5a–5d successively and for transferring the images formed on the photosensitive drums onto the transfer sheet P at transfer positions. Further, a sheet supply cassette 11 for supplying the sheet P to the transfer belt 7 is arranged at a sheet input side of the transfer belt 7. On the other hand, at a sheet output side of the transfer belt 7, there are arranged a fixing device 12 for fixing the superimposed toner images to the transfer sheet P and an ejection tray 13 on which the transfer sheet after the fixing is ejected.

The transfer belt 7 is constituted by a belt-shaped sheet material extending between and wound around two rollers 8, 9 and acts to position the transfer sheet P on an upper run of the belt to move the transfer sheet from a first station to a fourth station (described later) by rotating in a direction shown by the arrow in FIG. 2 by the rotation of the rollers 8, 9. The material of the transfer belt 7 may be polyurethane group, polycarbonate group, PVdF polyvinylidene fluoride or the like. Incidentally, the reference numeral 10 denotes a tension roller.

In FIG. 2, from an upstream side to a downstream side in a transfer sheet feeding direction, there are a first station (image forming station including the photosensitive drum 1a) where the magenta color toner image is formed on the photosensitive drum, a second station (image forming station including the photosensitive drum 1b) where the cyan color toner image is formed on the photosensitive drum, a third station (image forming station including the photosensitive drum 1c) where the yellow color toner image is formed on the photosensitive drum, a fourth station (image forming station including the photosensitive drum 1d) where the black color toner image is formed on the photosensitive drum.

That is to say, in the first station, the image light L is exposed, via the optical scanning device 2a, on the photosensitive drum 1a uniformly charged by the primary charger 3a in response to the magenta image information, thereby forming an electrostatic latent image on the drum 1a. The electrostatic latent image is sent to the developing device 4a by the rotation of the photosensitive drum 1a, where the magenta toner is applied to the latent image by the developing device 4a, thereby visualizing the latent image as a magenta toner image. The toner image is sent to the transfer charger 5a where the toner image is transferred onto the transfer sheet P by the transfer charger 5a. After the transferring operation, the photosensitive drum 1a is cleaned by the cleaning device 6a to remove the residual toner from the drum, thus preparing for the next image formation. Similarly, in the second, third and fourth stations, cyan, yellow and black toner images are successively transferred onto the same transfer sheet P in the superimposed fashion.

On the other hand, a transfer sheet P in the sheet supply cassette 11 is supplied from the sheet supply cassette onto the transfer belt 7 by a sheet supply means (not shown) and positioned and fixedly held on the belt. Then, the transfer sheet on the transfer belt is passed through between the photosensitive drums and the associated transfer chargers of the first to fourth stations, meanwhile the four color toner images are successively transferred onto the transfer sheet. The transfer sheet is separated from the transfer belt and is sent to the fixing device 12 where the toner images are fused and mixed to be fixed to the transfer sheet. Thereafter, the transfer sheet is ejected onto the ejection tray 13.

Next, the control for the image formation in the above-mentioned image forming system will be explained with reference to FIG. 1. FIG. 1 is a view showing an image reading and outputting portion of the image forming system, for explaining the treatment and control for the image light L at a representative station, here the third station of FIG. 2 where the yellow image is formed.

In the image reading and outputting portion, after an image on an original 20 is read by a reader, the read image light L is sent to a CCD 21, there by decomposing it into three image signals R (red), G (green), B (blue). The three output signals R, G, B are converted into eight-bit digital signals by an A/D converter 22. Then, these digital signals R, G, B are sent to a density converter 23 where they are converted into a C1 (cyan) signal, an M1 (magenta) signal, an Y1 (yellow) signal and a K1 (black) signal. Then, these signals are sent to a masking device 24 where they are masked by the masking device to convert the signals into a C2 (cyan) signal, an M2 (magenta) signal, an Y2 (yellow) signal and a K2 (black) signal. These output signals C2, M2, Y2, K2 are gradient-corrected to provide a C3 (cyan) signal, an M3 (magenta) signal, an Y3 (yellow) signal and a K3 (black) signal by a gradient correction device 25 via a look-up table in the device. Then, the corrected signals are sent to a controller 26.

The "masking" means the fact that the difference between the spectrum distribution obtained by a spectrofilter of the CCD 21 and the color wavelength of each toner is corrected. There is the following relation between the input signals Y1, M1, C1, K1 to the masking device 24 and the output signals Y2, M2, C2, K2 from the masking device 24:

$$\begin{bmatrix} Y2 \\ M2 \\ C2 \\ K2 \end{bmatrix} = \begin{bmatrix} b11 & b12 & b13 & b14 \\ b21 & b22 & b23 & b24 \\ b31 & b32 & b33 & b34 \\ b41 & b42 & b43 & b44 \end{bmatrix} \begin{bmatrix} Y1 \\ M1 \\ C1 \\ K1 \end{bmatrix}$$

And, for example, regarding the yellow signal Y2, the following equation is obtained:

$$Y2 = b11Y1 + b12M1 + b13C1 + b14K1$$

In this case, b11, b12, . . . , b44 are each referred to as "masking coefficient", and are coefficients used in the masking device to correct the signals Y1, M1, C1, K1 to the signals Y2, M2, C2, K2.

On the other hand, a potential sensor 30 for detecting the surface potential of the photosensitive drum 1c is disposed on the drum. A signal from the potential sensor 30 is sent to the controller 26 via a potentiometer 31. A toner density sensor 32 is disposed in the developing device 4c, and a signal from the toner density sensor is also sent to the controller 26 to promote the proper supply of the toner. Incidentally, the toner density sensor may be of light reflection type, inductance type, patch detection type or the like.

Further, visible toner (in this case, magenta toner) images (test patches K) for the image density detection are formed on the transfer belt 7 in the vicinity of the photosensitive drum 1c at predetermined position thereon via the photosensitive drum 1c. Patch density detectors 33 each comprising an LED (light emitting element) 33a and a photodiode (light receiving element) 33b are arranged in the proximity of the test patches K. The LED 33a emits light onto the test patch K in response to the command from the controller 26, and the light reflected from the test patch is received by the photodiode 33b. A signal from the photodiode is sent to the controller 26 as a density signal. Incidentally, although the image density of the test patch K is outputted as 80 hexa, it can be outputted at 256 color gradient stages of eight-bit from 0 hexa (white) to 256 hexa (all black).

Figure 3:
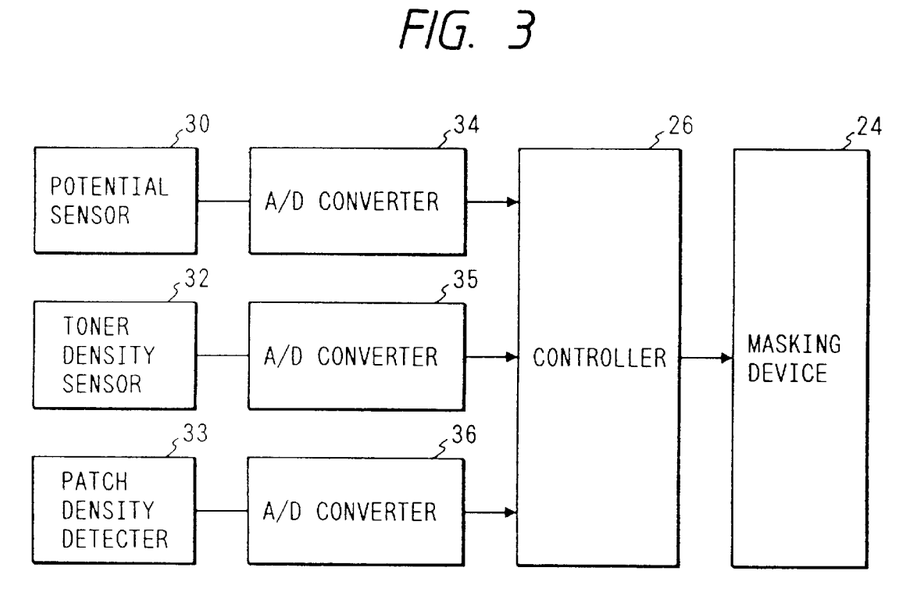
FIG. 3 is a control block diagram for controlling image density of the image forming system of FIG. 1.

As shown in FIG. 3, the controller 26 receives the latent image potential information of the photosensitive drum 1 from the potential sensor 30, the toner density information of the developing device 4 from the toner density sensor 32, and the patch density information from the patch density detectors 33 after converted into the digital signals by the A/D converters 34, 35, 36 and controls the masking device 24 on the basis of such information to control the image density by varying the light amounts of the images (lens light amounts) of the optical scanning devices 2.

That is to say, a table for the masking coefficient to increase the output signals Y2, M2, C2, K2 is provided in the masking device 24. Thus, for example, when the image density relating to the yellow signal Y2 is desired to increase by a predetermined amount by the signal from the controller 26, the masking coefficients such as b'11, b'12, b'13, b'14 are used to provide the following equation:

$$Y2 = b'11Y1 + b'12M1 + b'13C1 + b'14K1$$

On the other hand, when the image density is desired to decrease by a predetermined amount, the masking coefficients such as b"11, b"12, b"13, b"14 are used to provide the following equation:

$$Y2 = b"11Y1 + b"12M1 + b"13C1 + b"14K1$$

Accordingly, since the masking coefficient of the masking device 24 can be changed by the signal from the controller 26, the output signals Y3, M3, C3, K3 from the gradient correction device 25 can also be changed, thereby changing the light amount of the image of the optical scanning device 2 by the controller 26 to change the image density.

If the controller 26 judges that the image density of the test patches K (formed on the transfer belt 7) detected by the patch density detectors 33 is different from predetermined density (80 hexa), the controller 26 judges whether such difference is based on the toner density in the developing device 4 or is based on the potential of the latent image on the photosensitive drum 1. If it is judged that the change in the density of the test patch K is not based on the toner density in the developing device 4 and the potential of the latent image on the photosensitive drum 1, that is to say, when the latent image property and developing property due to the change in sensitivity of the photosensitive drum is varied or when the toner is deteriorated or when the manufacturing errors in the control system are overlapped, the controller 26 emits a predetermined signal to the masking device 24, so that the masking coefficient is changed to change the output signals from the gradient correction device 25, thereby forming the image having the proper density.

If the controller 26 judges that the density signals from the toner density sensors 33 are different from reference density, the controller 26 does not emit the signal to the masking device 24, thereby waiting until the toner is correctly supplied to the developing device 4. Further, if the controller 26 judges, on the basis of the signals from the potential sensor 30, that the image density of the test patch K is varied because the contrast potential (difference between the bright potential (potential of the latent image) on the photosensitive drum 1 and the bias voltage from the developing device 4) and/or the back potential (difference between the dark potential and the bias voltage from the developing device 4) are not correct, an error message is emitted such as to potential control circuit 37 as in the discussion of FIG. 6, below.

However, even if the toner density is not proper or even if the potential of the latent image on the photosensitive drum is not proper, it should be understood that the image having the proper density can be obtained by changing the masking coefficient in the masking device 24 on the basis of a predetermined signal emitted from the controller 26.

The test patches K may be formed for each color at each of the image forming stations (in this case, the test patches K are formed at different positions slightly offset from each other on the transfer belt 7) so that they can be detected by the patch density detectors 33 provided at image forming stations to effect the above-mentioned control at each of the image forming stations, or the above-mentioned control is effected only at a special image forming station.

As mentioned above, since the density of the test patch K is detected and, if the density of the test patch is not correct, the masking coefficient is changed to a correct one to increase or decrease the light amount for the image in the optical scanning device 2c so that the density of the image can be changed to the proper one, the change in the delicate color tone in the multi-color image due to the deterioration of the photosensitive drum(s), the deterioration of the toner and/or the cumulative error in the control system can be corrected to obtain the proper image. Accordingly, particularly in the image including picture(s), it is possible to obtain the high quality image having the stable color balance including gray balance.

Next, a second embodiment of the present invention will be explained with reference to FIGS. 1 and 4. Incidentally, the constructional elements having the same functions as those in the first embodiment are designated by the same reference numerals, and the detailed explanation thereof will be omitted.

In this second embodiment, the patch density detectors 33 for detecting the density of the test patches K are used as registration sensors. More particularly, the test patches K of magenta toner, cyan toner, yellow toner and black toner are transferred to and superimposed on the transfer belt 7, and the density of the superimposed test patches K is detected by the patch density detectors 33 disposed at the first to fourth stations. In this case, at the first station, the magenta toner test patch K is detected by the patch density detector 33, and, if the density of this test patch is not correct, the masking coefficient in the masking device 24 is corrected by the controller 26, thereby forming the image having the proper density. Then, at the second station, the cyan toner test patch K is superimposed on the magenta toner test patch K, and these test patches are detected by the patch density detector 33 to check the discrepancy in the patches and accordingly the discrepancy in transferred positions.

Similarly, at the third and fourth stations, the discrepancy in transferred positions is detected by the patch density detectors 33. Accordingly, the patch density detectors arranged at the second, third and fourth stations also act as registration sensors.

Figure 4:
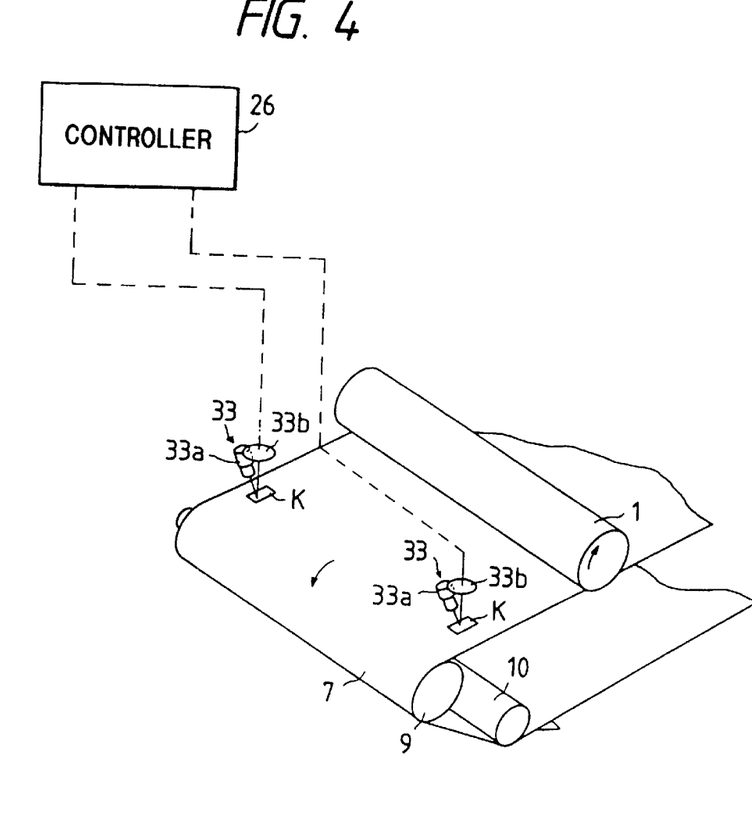
FIG. 4 is a perspective view showing a condition that the density of test patches formed on a transfer belt of an image forming system according to second embodiment of the present invention are read by patch density detectors.

Further, as shown in FIG. 4, not only in the longitudinal direction of the transfer belt but also in the widthwise direction of the belt, test patches K may be transferred onto the belt so that, by detecting these test patches by the patch density detectors 33, the discrepancy in transferred positions in the widthwise direction of the belt can be detected similarly.

In the first and second embodiment, although the relative position between the test patches K in each station is determined, it is not determined where the test patches are positioned on the transfer belt 7. Accordingly, if the test patch K is formed on a damaged portion of the transfer belt 7, it is feared that the proper density cannot be detected. Thus, the positional relation between the test patches K and the transfer belt 7 may be controlled so that the test patches K are transferred onto non-damaged portions of the transfer belt 7 without fail. Further, for example, since the black toner including carbon black absorbs near infrared rays, it is feared that the density of the toner cannot be detected by the patch density detector 33. In this case, however, the test patches K similar to that of black toner may be formed by magenta toner, cyan toner and black toner so that the density of each of these test patches is detected by the patch density detector 33.

Incidentally, in order to ensure that the test patch K formed on the transfer belt 7 at the station disposed at an upstream side in the transfer sheet feeding direction is not transferred onto the photosensitive drum 1 at the station disposed at a down stream side in the sheet feeding direction, each photosensitive drum 1 is so designed that it does not contact with the test patches K mechanically by an appropriate engaging and disengaging mechanism or electrically by the surface potential of the photosensitive drum.

As apparent from the foregoing explanation, according to the above-mentioned embodiments, when the multi-color image is formed on the transfer sheet carried on the transfer sheet and image transferring means by using a plurality of image bearing members, since the image density is maintained to the proper value by the controller in accordance with the density of the test density patterns, it is possible to control the delicate color tone by the image forming system, thereby providing the high quality image having the excellent color balance.

Figure 5:
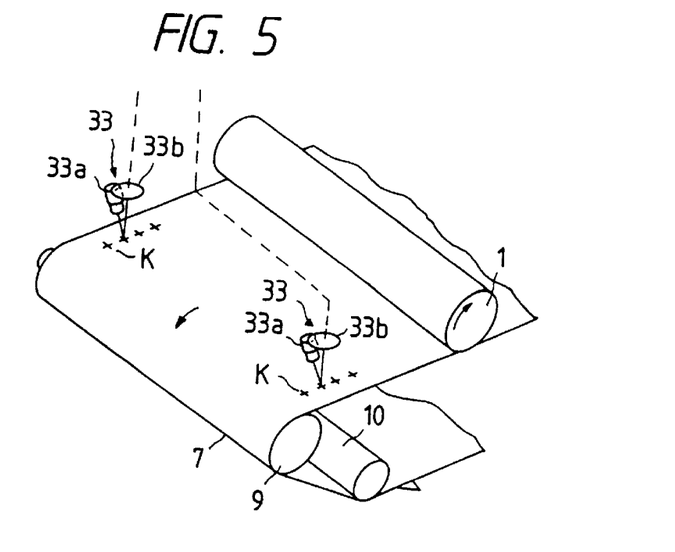
FIG. 5 is a view showing an alteration of a shape of the test patch.

Incidentally, it should be noted that the shape of each test patch K is not limited to one illustrated in FIG. 4, but may be circular or may be formed as a special figure or character such as symbol x as shown in FIG. 5.

Next, a third embodiment of the present invention will be explained. Incidentally, in this third embodiment, since the whole construction of an image forming system is the same as that shown in FIG. 2, the detailed explanation thereof will be omitted.

Figure 6:
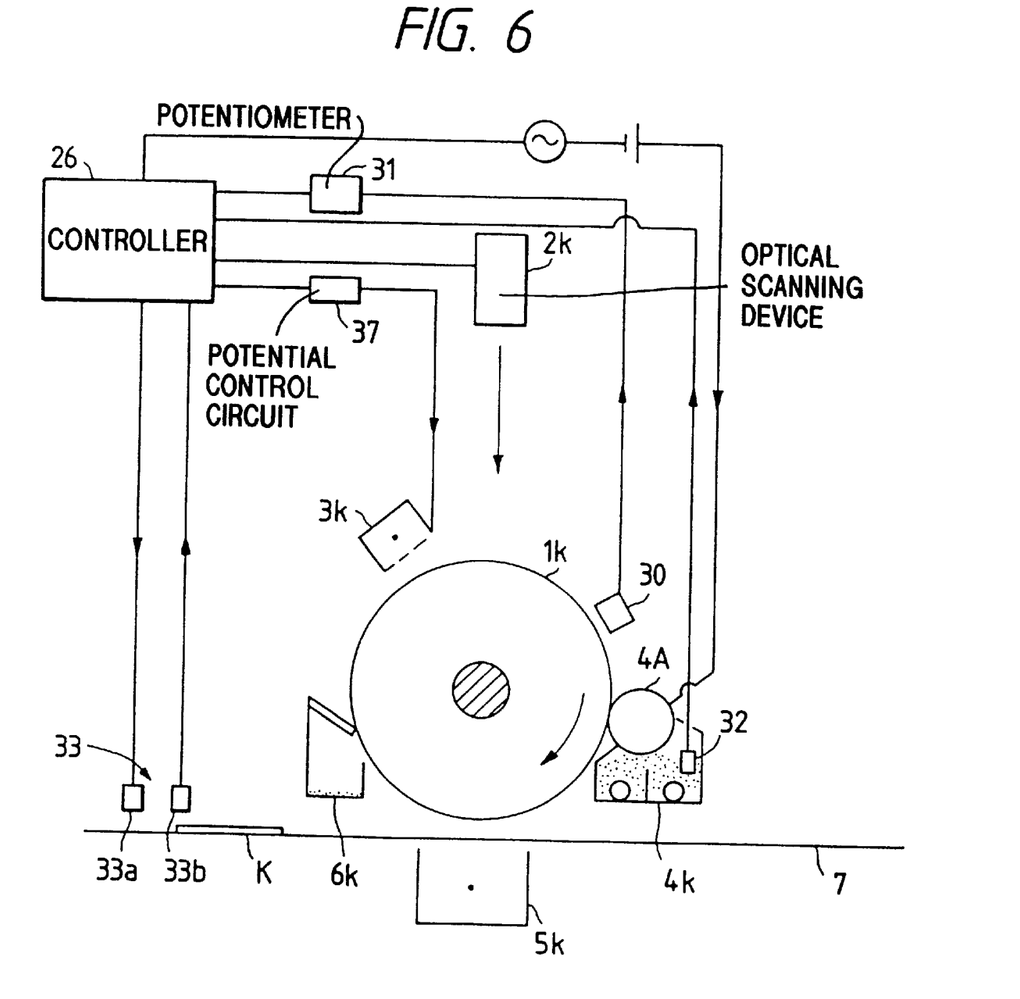
FIG. 6 is an enlarged constructual view of a main portion of an image forming system according to a third embodiment of the present invention.

FIG. 6 shows the station for the black toner among the above-mentioned four stations of the system of FIG. 2 with an enlarged scale, as an example. In this third embodiment, other stations are similarly designed.

In FIG. 6, a potential sensor 30 similar to the above-mentioned one serves to detect the surface potential of the photosensitive drum 1k. A potentiometer 31 is connected to the potential sensor 30. The potentiometer 31 is connected to a controller 26 so that information (detected value) regarding the surface potential of the photosensitive drum 1k is sent to the controller 26.

Further, a developer density sensor 32 acting as a toner density sensor is provided so that the toner is replenished in response to a signal from the developer density sensor 32 to keep the density of the toner in a developing device 4k constant. This sensor may be of light reflection type, inductance type, patch detection type or the like, for example. The information from the developer density sensor 32 is also sent to the controller 26.

Patch density sensors 33a, 33b serve to read the density of test patches K on a transfer belt 7, and signals from the patch density sensors are also sent to the controller 26. Incidentally, the test patches K are visualized on the photosensitive drum 1k by the toner and are transferred onto the transfer belt 7 by transfer charger 5K as visualized images. After the transfer operation, the photosensitive drum 1K is cleaned by cleaning device 6K. Each test patch K may be a step patch having eight or sixteen gradiations from the minimum density to the maximum density, or a patch having the special single density.

Each test patch is formed as a pattern latent image by a test pattern generator as a test pattern forming means (not shown) disposed in the proximity of the photosensitive drum 1k and is visualized on the photosensitive drum by the toner. Further, the controller 26 also controls an optical scanning device 2k so that the light amount of the image can be changed on the basis of the potential information, developer density information and patch density information as mentioned above. Furthermore, DC electric field and fixed AC electric field are applied to a non-magnetic developing sleeve 4A of the developing device. Such developing bias ($V_{DC}$) is variable.

Figure 7:
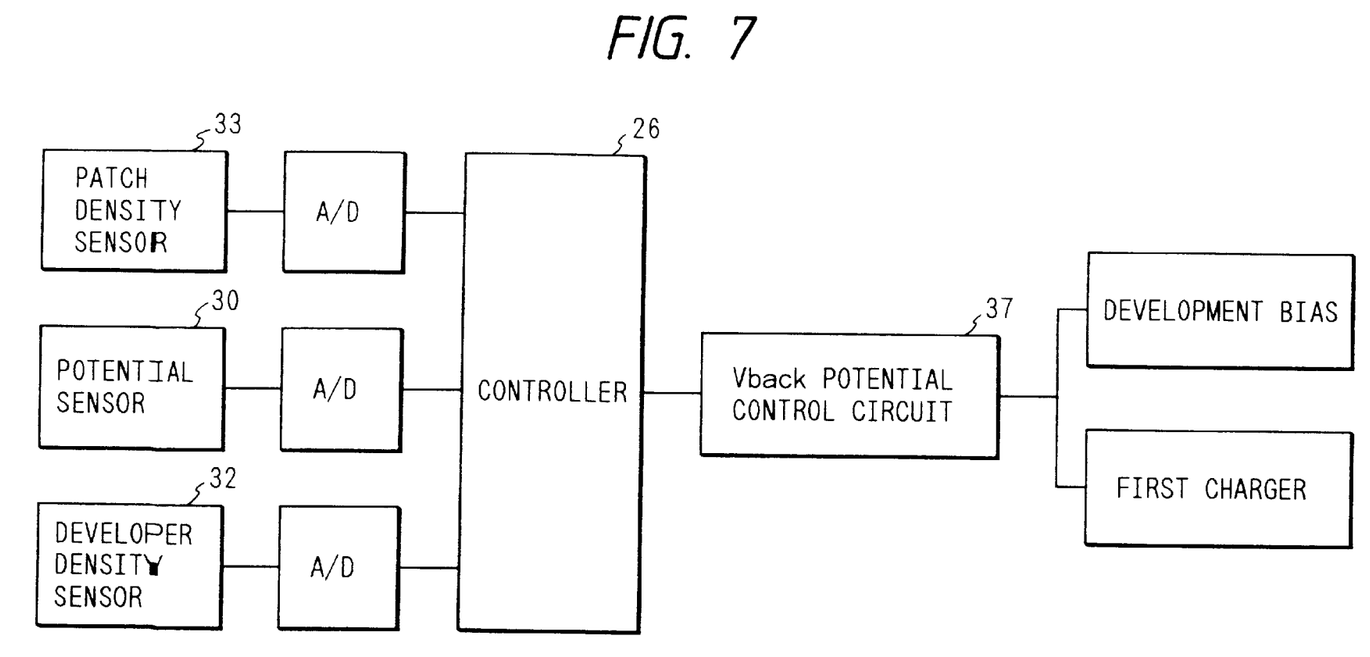
FIG. 7 is a control block diagram of the system of FIG. 6.

FIG. 7 shows a control block diagram for controlling a voltage Vback defining the difference the dark potential and the potential of the developing bias to maintain the highlight portion reproductivity by the output from each sensor. Explaining the control with reference to FIG. 7, signals from the patch density sensors 33 reading the patch density of the test patches K on the transfer belt 7 are A/D-converted as density signals which are inputted to the controller 26.

Figure 8:
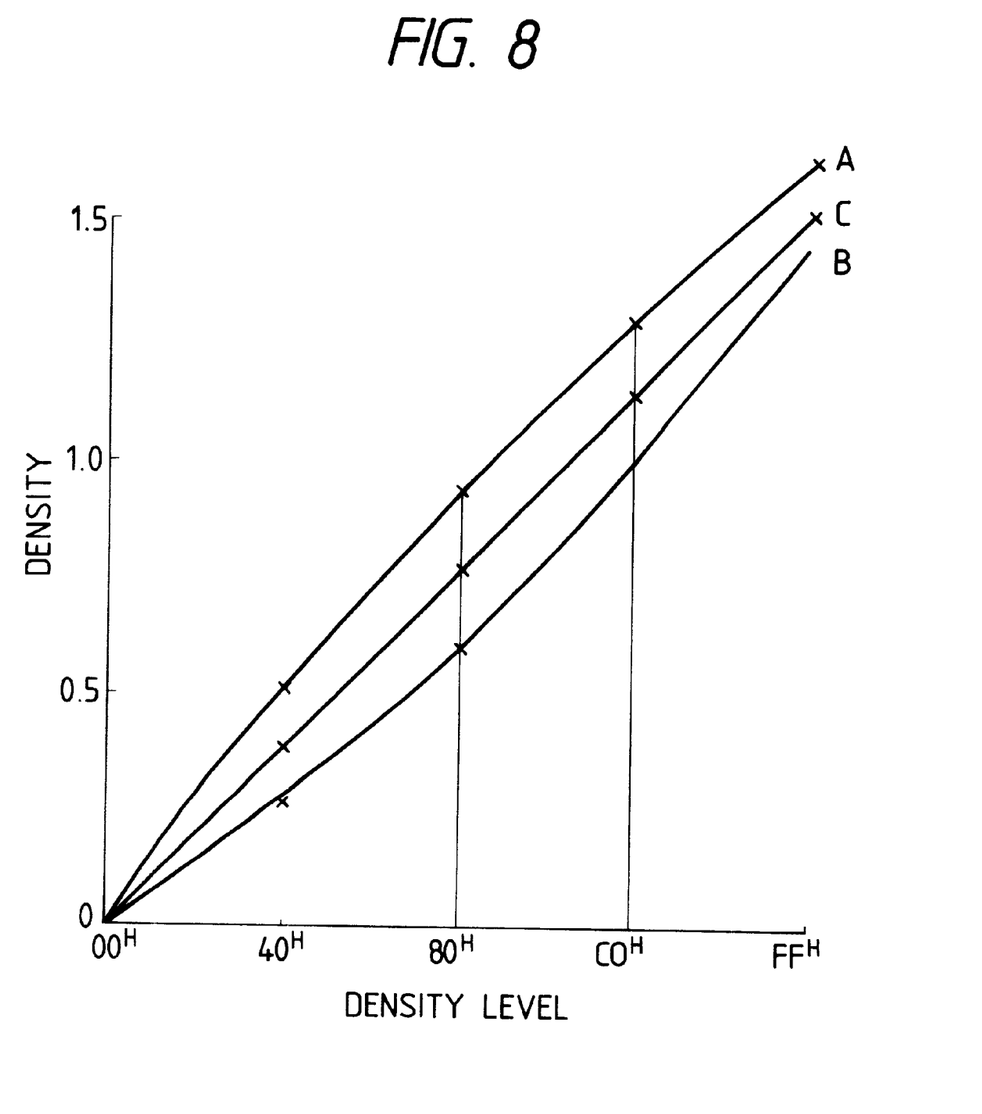
FIG. 8 is a graph showing an example of the change in density.

Incidentally, in this case, the toner density may be changed to cause the maximum variation in the control accuracy or the latent image property and developing property due to the change in the sensitivity of the photosensitive drum 1 may be changed from a condition shown by a line C in FIG. 8 to a condition shown by a line A or line B.

Thus, at the same time that the density information of the patches K is inputted to the controller 26, the following starting judgment is effected. That is to say, it is judged whether the potential is correctly attained to the developing contrast potential Vback of a primary chargers 3k aimed by the controller 26 in response to the signal from the potential sensor 30. If the potential is not controlled correctly, the error message is emitted not to perform a further control for the potential Vback.

Further, it is judged whether the ratio between the toner density T and the toner density (T+C) at that time is different from the reference density on the basis of the output from the developer density sensor 32; if the ratio is equal to the reference density, control is not effected. When the detected value of the potential sensor 30 and the detected value of the developer density sensor 32 are both correct and the detected values of the patch density sensors 33 are detected as high density as shown by the line A in FIG. 8, the command for reducing the density by an amount corresponding to the increased amount is emitted from a contrast potential control circuit (control means) 37 to a primary charger 3k and the developing bias control, thereby increasing the value Vback (difference between the dark potential and the developing bias). Incidentally, the increase in the value Vback may be effected by controlling the dark potential and/or the developing bias. On the other hand, if the lower density as shown by the line B is detected, the reverse control is effected.

Further, if the toner density from the output of the developer density sensor 32 is deviated from the reference density at the maximum (for example, after the toner is considerably consumed by forming a plurality of all black copies continuously, when a large amount of toner is replenished at a time), the Vback potential control according to the present invention is not effected immediately, but may be effected at the time when the toner density is returned to the reference density. Further, a converting table for determining how value of Vback potential is corresponding to the amount of discrepancy between the toner density detected by the developer density sensor 32 and the reference density (for example, a signal corresponding to the replenished toner amount) may be provided so that the Vback potential control can be effected by calculating the increase or decrease in the toner amount, thereby correcting the variation in the toner density.

According to the image forming system having the above-mentioned arrangement, even if the sensitivity of the photosensitive drum(s) is changed for a long time or the developing property is changed, it is possible to always obtain the image having the stable highlight portion. Further, the system may be combined with another conventional image stabilizing means to further stabilize the image.

Next, a fourth embodiment of the present invention will be explained. Since the fundamental construction of an image forming system according to the fourth embodiment is substantially the same as that of the third embodiment, only the characteristic portion of the fourth embodiment will be described.

While the Vback potential control was effected on the basis of the potential information on the photosensitive drum (latent image condition) and the developer density information (developing condition) in the above-mentioned third embodiment, in the fourth embodiment, the Vback potential control is effected by detecting and controlling the change in the transferring efficiency (transferring condition), in addition to the latent image condition and the developing condition.

In order to detect the change in the transferring efficiency, test patches (patterns) previously visualized under the proper latent image condition and the proper developing condition, for example, $FF^H$ (indicating 255 levels of eight-bit (0–255 levels) by the hexadecimal system) and $80^H$ (indicating 128 levels by the hexadecimal system), are transferred onto the transfer belt, and the ratio of density between these patches is used as a reference value with which the actual density of the transferred image is compared in the actual sequence, so that the change in the transferring efficiency is detected. If the actual density is greater than the threshold value, the error message is emitted, or the transferring efficiency is corrected by changing the potential applied to the transfer belt from a transfer charger 5k. And, after the transferring efficiency is restored, the Vback potential control is effected.

In this way, by further considering the transferring efficiency, it is possible to further stabilize the highlight portion.

Next, a fifth embodiment of the present invention will be explained. Also in this fifth embodiment, the fundamental construction of the system is the same as that of the third embodiment.

In this embodiment, the patch density detectors 33a, 33b as shown in FIGS. 4 and 5 are also used as registration sensors for the full-color image. Further, to check the registration in an axial direction of the drum transverse to the transfer sheet feeding direction, as well as the registration in the sheet feeding direction, such detectors are arranged on both sides of the transfer belt 7.

When the density of the all black images (test patches) K having the same $FF^H$ is read by the patch density and registration sensors 33a, 33b, the change in density will often appears due the uneven supply of toner. Thus, the density of these two patches K is calculated to obtain a single density signal, which is sent to the controller 26 to control the density.

Incidentally, in all of the aforementioned embodiments, it is preferable that the test patches are always transferred onto the same positions of the transfer belt so that the test patches are not influenced upon the damaged portion(s) of the transfer belt to correctly read the density of the test patches. Further, when the toner including carbon black is used, since the toner absorbs the near infrared rays, if the signal is not emitted, as in the same manner as mentioned above, the black test patch is preferably formed on the color image such as magenta toner image, cyan toner image or yellow toner image so that the density signal can be obtained by the reflected light from the color toner image.

Further, in the aforementioned embodiments, while the image forming systems having four stations were explained, when the magenta test patches are formed at the first station, such test patches will mechanically contact with the photosensitive drums at the cyan, yellow and black stations, with the result that the toner images would be distorted. Thus, it is preferable that, when the test patches formed at the upstream station pass through the downstream station, the photosensitive drum of the downstream station is disengaged from the transfer belt 7, for example, by releasing an urging member for urging the photosensitive drum against the transfer belt or by lowering the transfer belt.

The third to fifth embodiments have the above-mentioned construction and function, and is provided with pattern forming means for forming as predetermined patterns on image bearing members, pattern density detection means for detecting the density of the patterns transferred to a feeding means, toner density detection means and potential detection means for correcting the change in the toner density and the sensitivity of the drums for a long time, so that the dark potential and/or developing bias are changed by the total control on the basis of the detected data to obtain the image having the stable highlight portion, thereby improving the image quality.

Incidentally, in the above-mentioned embodiments, while the test toner image were directly formed on the transfer belt and were detected by the sensors, the test toner images may be formed on the transfer sheet carried on the transfer belt.

What is claimed is:

1. An image forming apparatus forming a full-color image by plural color materials, comprising:

color-separating means for color-separating an image of an original to form plural color separated signals;

conversion means for converting the plural color separated signals in a predetermined conversion ratio so as to obtain plural color signals corresponding to each of the plural color materials;

image forming means for forming a color image by the color signals, said image forming means being capable of forming a test image of a single color;

density detection means for detecting a density of the test image; and control means for controlling the conversion ratio of the plural color separated signals based on a detection result detected by said density detection means, wherein said image forming means has a photosensitive member, exposure means for exposing the photosensitive member and forming an electrostatic image, and development means for developing the electrostatic image on the photosensitive member by a color material, and wherein said development means has a developing device for containing the color material and a carrier, a density detect sensor for detecting the color material density in the developing device, and a supplement mechanism for supplementing the color material into the developing device based on a detected output by said density detect sensor, and said control means delays the control of the conversion ratio, when the detected output in said density detect sensor is different from a predetermined density, until the developing device is supplemented.

2. An image forming apparatus according to claim 1, wherein said conversion means calculates color coefficients based on the conversion ratio, and applies the color coefficient to the plural color separated signals.

3. An image forming apparatus according to claim 2, wherein said control means has plural tables of predetermined coefficients which are selected based on the detected result by said test image density detection means.

4. An image forming apparatus forming a full-color image by plural color materials, comprising:

color separating means for color separating an image of an original and forming a color separating signal;

converting means for converting the color separation signal to a color signal corresponding to each color material;

correction means for correcting a color mixing balance of the plural color signals;

image forming means for forming a color image by the color signal corrected by said correction means, said image forming means being capable of forming a test image of a single color;

density detection means for detecting a density of the test image; and control means for controlling the color mixing balance by said correction means based on a detected result by density detection means, wherein said image formation means has a photosensitive member, exposure means for exposing the photosensitive member and forming an electrostatic image, and development means for developing the electrostatic image on the photosensitive member by a toner, and wherein said development means has a developing device for containing the toner and a carrier, a toner density detect sensor for detecting the toner density in the developing device, and a supplement mechanism for supplementing the toner into the developing device based on a detected output by said toner density detect sensor, and said control means delays the control of the correction condition, when the detected output in said toner density detect sensor is different from a predetermined density, until the developing device is supplemented by the toner.

5. An image forming apparatus according to claim 1, wherein said density detection means detects density of the test image for each color material, and said control means controls the conversion ratio based on the plural detected density for each color material.

6. An image forming apparatus according to claim 1 or 4, wherein said image forming means has plural image forming stations including the photosensitive member, an exposing source and a developing device corresponding to each color material.

* * * * *